UNITED STATES PATENT OFFICE.

JUDSON A. DE CEW, OF MONTREAL, QUEBEC, CANADA.

WOOD-PRESERVATIVE.

1,140,127.      Specification of Letters Patent.      Patented May 18, 1915.

No Drawing.      Application filed June 25, 1913. Serial No. 775,793.

*To all whom it may concern:*

Be it known that I, JUDSON A. DE CEW, of the city of Montreal, in the Province of Quebec and Dominion of Canada, a subject of the King of Great Britain, have invented certain new and useful Improvements in Wood-Preservatives, of which the following is a full, clear, and exact description.

This invention relates to wood preservatives, and has for one of its objects to provide a material for the treatment of wood, which will render it resistant to the attack of ferments, fungi and insects, and at the same time harden the wood treated.

In my prior application Serial No. 672,760, filed Jan. 22, 1912, I describe a product treated with a mixture or material such as the one described herein and the main object of the present application is to protect said mixture.

In the treatment of wood by impregnation with oil, it is necessary to use comparatively large quantities of oil and to thoroughly impregnate the fibro-cellular bodies, and a large excess of oil must remain in the wood without resultant benefits. By the use of this material, the exact amount of oil necessary for preservation is introduced, and this is carried into the wood in the form of an emulsion until the desired depth of penetration is obtained.

My invention consists essentially in a mixture or emulsion of suitable quantities of waste sulfite liquor, oil, and a soluble salt such as chlorid of zinc, and this material is introduced into a suitable treating tank containing the wood to be treated by a suitable injector apparatus.

The preferred method of carrying out my process is to place timber in the form of boards or the like in a closed tank and subject the former to a steaming process, after which the steam and air are withdrawn from the tank by any suitable means. By withdrawing the air and steam from the material, the wood is left free to absorb the mixtures or emulsions mentioned. A quantity of waste sulfite liquor and crude oil or creosote oil with chlorid of zinc, suitably mixed to form an emulsion and sufficiently large to impregnate the cellular cavities of the wood is then introduced into the tank by means of an injector apparatus. The relative amounts of the preserving materials may be limited to the desired quantities and may be controlled to meet requirements. The absorption of the emulsion may be increased by subjecting the contents of the vessel in which the wood is placed to pressure. After the mass has been allowed to cool, the excess material is removed. For certain purposes, the operation may be repeated if necessary. As a result of the impregnation and absorption of organic material, the wood is rendered harder, heavier and stronger.

By introducing waste sulfite liquor, several important results are accomplished. The waste sulfite liquor alone acts as a preservative and hardening medium and being a cheaper material, may replace in part any of the other preservatives used. The most important function, however, of the waste sulfite liquor is to act as an emulsifying agent. Its capacity for forming an emulsion with oil makes it possible to combine definite proportions of oil with any water soluble salts. Another important function of the organic matter of the waste sulfite liquor, when used with any mixture containing creosote or other oil, is that it greatly reduces the rate of evaporation of the lighter oils from the mixture. Furthermore, there is little or no waste of the more expensive oil as would result from the use of oil alone by reason of the fact that an excess of material used is generally left in the cellular cavities of the material treated.

Having thus described my invention, what I claim is:—

1. A preservative material comprising a mixture of waste sulfite liquor and creosote oil.

2. A preservative material comprising a mixture of waste sulfite liquor, oil and a soluble salt.

3. A preservative material comprising a mixture of waste sulfite liquor, creosote oil and chlorid of zinc.

In witness whereof I have hereunto set my hand in the presence of two witnesses.

JUDSON A. DE CEW.

Witnesses:
    STUART R. W. ALLEN,
    G. M. MORELAND.